W. ROBINSON.
REVERSIBLE TURBINE.
APPLICATION FILED JUNE 5, 1908.
994,201.
Patented June 6, 1911.
2 SHEETS—SHEET 1.
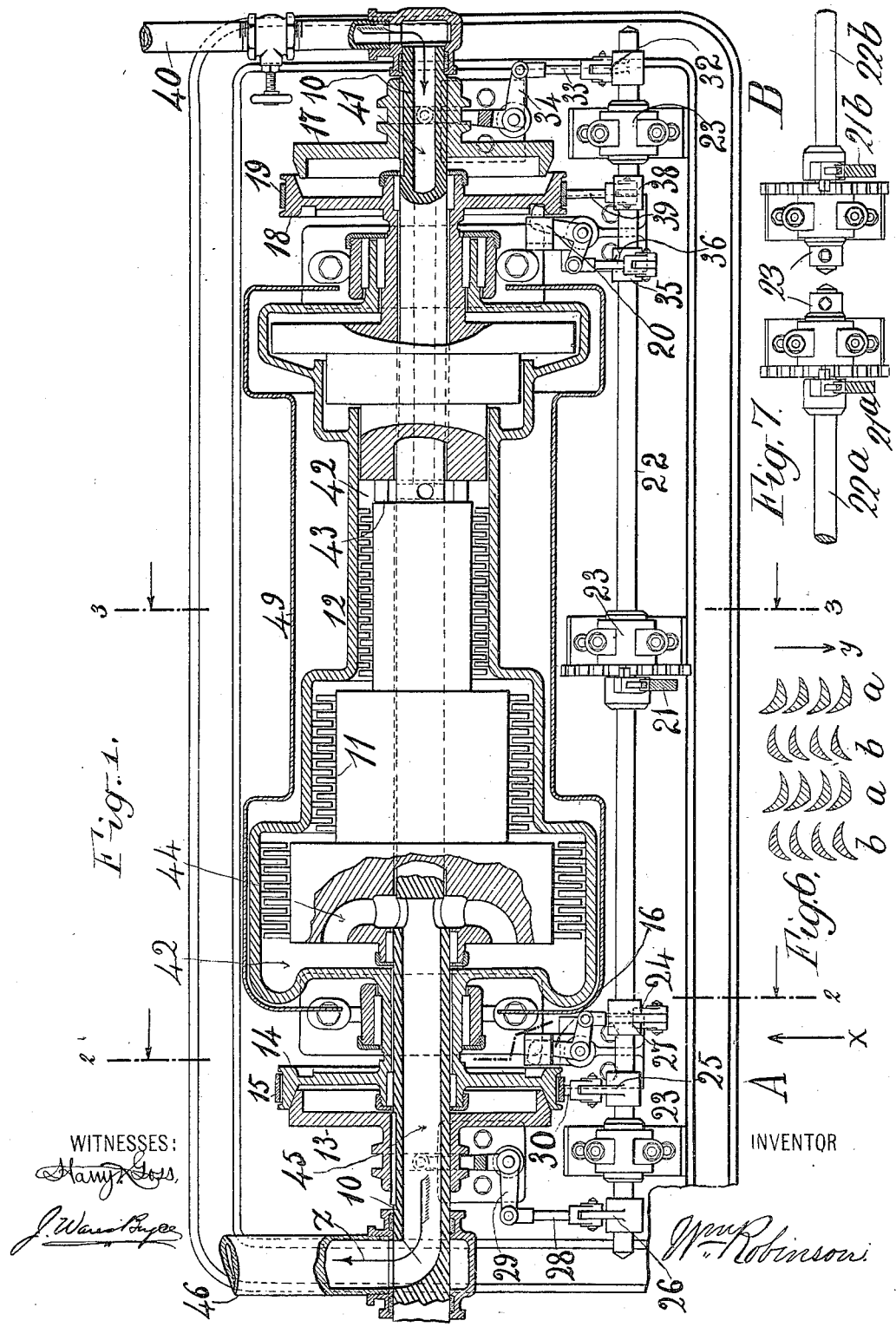

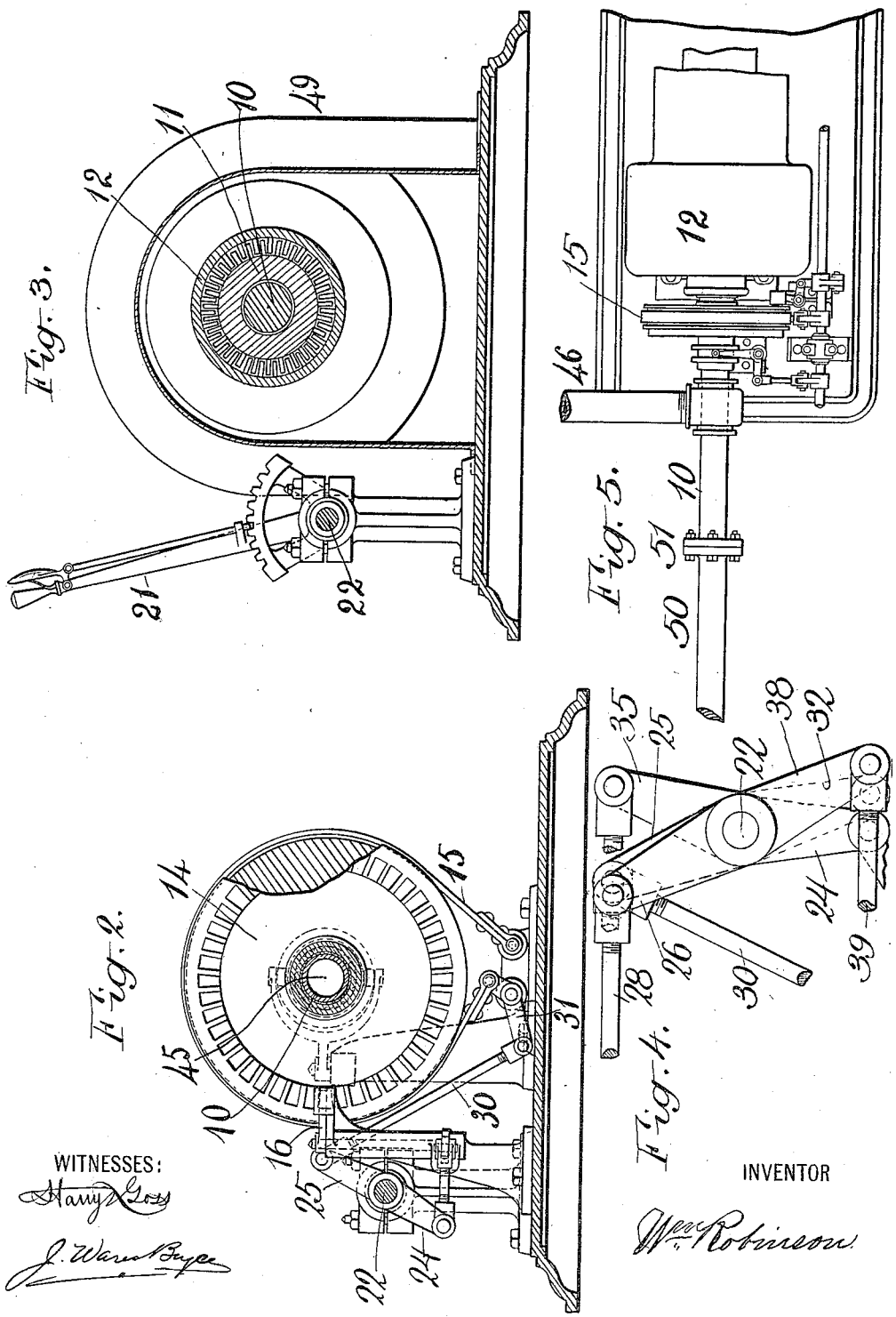

UNITED STATES PATENT OFFICE.

WILLIAM ROBINSON, OF BROOKLYN, NEW YORK.

REVERSIBLE TURBINE.

994,201.   Specification of Letters Patent.   Patented June 6, 1911.

Application filed June 5, 1908. Serial No. 436,773.

*To all whom it may concern:*

Be it known that I, WILLIAM ROBINSON, a citizen of the United States, and resident of Brooklyn, in the county of Kings and State of New York, have invented a new and Improved Reversible Turbine-Engine to be Operated by Steam or other Suitable Fluid-Pressure, of which the following is a specification.

My invention relates to means for reversing the direction of drive of turbine engines, and comprises a driving shaft and two concentric rotors, and means for securing either rotor independently to the driving shaft while the other is held in a rigid non-rotating position, the direction of drive depending on which rotor is secured to the driving shaft while the other is held fast in a rigid position.

The nature of my invention will be understood from the description which follows, reference being had to the accompanying drawings, which form a part of this specification, in which—

Figure 1 represents a longitudinal section of a turbine steam engine with a plan of the controlling mechanism, illustrating my invention; Fig. 2 is a cross section through 2, 2, Fig. 1, looking toward the left, in the direction of the arrows; Fig. 3 is a cross section, through 3, 3, Fig. 1, looking in the same direction; Fig. 4 is an enlarged elevation of some of the controlling mechanism; Fig. 5 is a plan of the left hand end of the machine, showing a direct connection of the driving shaft with the shaft to be driven; Fig. 6 is a cross section showing the relative position of the rings of operative blades or vanes, and Fig. 7 shows a divisional arrangement of the controlling shaft.

As illustrated in Fig. 1, the clutch 13, movable longitudinally on the shaft 10, but non-rotatable relatively thereto, engages the clutch disk 14 which forms a part of the outer rotor 12, while the brake 15 and the locking lever 16 are free from said clutch-disk. Thus the shaft 10 and the outer rotor 12 are secured together and must rotate as one. Referring now to the opposite end, B, of the machine, it will be observed that the clutch 17, which also moves longitudinally on the shaft 10, but is non-rotative thereon, is free from contact with the clutch disk 18, which forms a part of the inner rotor 11. It is also pointed out that the brake 19 and the lock on the bell crank 20 engage the clutch disk 18 and hold it fast, that is, the inner rotor 11 is securely anchored and cannot rotate. Now in order to reverse the direction of rotation, the outer rotor 12 must be detached from the shaft 10 and anchored, while the clutch 17 is caused to engage the clutch disk 18, and the brake 19 is released and the locking lever 20 withdrawn from the clutch disk 18. Thus the inner rotor 11 is locked to the driving shaft 10 and is rotatable therewith, while, as explained, the outer rotor 12 has been anchored. All of these changes may be accomplished by a single movement of the controller, as will be hereinafter explained.

It will be understood that the action of this machine depends upon the fact that the steam reacting from the fixed blades against the inclined faces of the rotor blades drives the machine in one direction, but when this condition of blades is reversed, the normal fixed blades becoming rotor blades and the normal rotor blades becoming fixed, the relative inclination of the new arrangement of rotor and fixed blades becomes reversed and consequently the direction of rotation of the driving shaft 10 is reversed. This will be understood by reference to Fig. 6, in which if the rings $a$ of the blades be regarded as fixed and the blades $b$ as rotor blades the impinging of steam upon said fixed blades $a$ and reacting upon the rotor blades $b$ will drive the shaft 10, say, in the direction of the arrow $x$, but if the blades $b$ be fixed and $a$ made rotor blades the shaft 10 will be driven in the reverse direction, as represented by the arrow $y$.

21 is a controlling lever secured to the controller shaft 22, which is supported on the bearings 23 and is rotatable through the arc of a circle. At the left hand end, A, of the controller shaft are secured thereto the projections or levers 24, 25 and 26, projecting therefrom at different angles. The lever 24 is connected to the bell crank lever 16, by the connecting rod 27, said bell crank lever operating to lock the disk 14 in position, while the lever 26 is connected by the rod 28 to the bell crank lever 29 for moving the clutch 13 along the shaft 10 to engage or disengage the disk 14. The lever 25 on the shaft 22 is connected by the rod 30 to the brake lever 31, (see Fig. 2), which controls the application of the brake 15 to the disk 14. Similar mechanism is mounted at the opposite end, B, of the controller shaft 22 for controlling the operation of the inner rotor 11, but this mechanism operates in the reverse direction from that just described, that is, it anchors the inner rotor 11 while the outer rotor 12 is in rotative condition. It will be noted that the rotation of the shaft 22 in the direction of the arrow $x$ brings the mechanism at the left or A end of the shaft into the position illustrated in Fig. 1. At the right hand or B end of the shaft 22, the lever 32 extends below the shaft and is connected by the rod 33 to the bell crank lever 34 which controls the position of the clutch 17. The lever 35 connected by the rod 36 to the bell crank lock 20, operates to lock the disk 18 in a non-rotative position as shown. At the same time the lever 38, below the shaft, is connected by the rod 39 to the brake 19, applying the same to the disk 18, (see Figs. 1 and 2). Now when the controller lever 21 rotates the shaft 22 in the reverse direction, that is, in the direction of the arrow $y$ the clutch 13 is released from the disk 14, the brake 15 is applied to stop the rotation of said disk and the lock lever 16 is applied to lock said disk, that is, the outer rotor 12, in a fixed position. The same movement of the shaft 22 causes the clutch 17 to engage the disk 18 of the rotor 11, and to release the brake 19 and the lock 20. The inner member 11 thus becomes the rotor while the outer member 12 becomes the fixed case.

Steam is admitted to the machine from the steam pipe 40 through the orifice 41 of the shaft 10, as shown by the arrow, and enters the operative chamber 42 of the machine at 43. After passing through to the opposite end of the working chamber 42 it again enters the shaft 10 at 44 and passes out through the tubular portion 45 of said shaft, to the exhaust 46, as indicated by the arrow Z. Assume now that one rotor is revolving and the other fixed, and it is desired to reverse the machine. It is not necessary to shut off steam at all in reversing. In rotating the controller shaft 22 there is a neutral point where the fixed member is released before the rotating member is arrested. Thus the steam acts upon both members, rotating them in opposite directions, but at half pressure for each. The brake is then applied to the first named rotating member, bringing it to a stand-still. Meantime the other rotor is getting in its work and instantly picks up the shaft and rotates it in the reverse direction. In some cases, however, it is preferable to control each rotor separately from the other. To do this it is only necessary to divide the controlling shaft 22 into two parts, 22$^a$ and 22$^b$, one part actuating the mechanism for controlling the movement of one rotor and the other for actuating the mechanism for controlling the operation of the other rotor. By this means one rotor may be regulated without disturbing the mechanical control of the other, when, for any reason, this may be desirable or advantageous; for instance, the speed may be regulated by slightly loosening up the fixed rotor so that it may rotate with more or less speed, thus absorbing some of the power concentrated on the other rotor; or the rotating rotor may be first disconnected from the shaft, leaving it without power, and the other rotor then connected to the shaft to reverse its direction of rotation.

The driving shaft 10 is connected to the driven shaft 50 in any suitable manner, for instance, by a bolted joint as shown at 51. If desired, however, the shaft 10 may be connected to a counter shaft in any usual or suitable manner, or by a belt, or gear, or clutch, to the machine to be driven.

It will be observed that when both rotors are mechanically free to rotate steam introduced between them will drive them in opposite directions, at the same time.

In this invention, as illustrated, steam is admitted to the working chamber through one end of the rotary shaft, and exhausted through the other end. This is a matter of simplicity and convenience; but I do not limit my invention to this method of furnishing steam to the rotors. It may be conveyed to them in any convenient or suitable manner and still be within the scope of my invention.

The protective case 49 incloses the rotors, thus preventing possible accidents to mechanism or persons.

Having thus described my invention what I claim as new and desire to secure by Letters Patent, is:

1. A turbine engine embodying a driving shaft and two concentric rotors mounted detachably thereon and adapted to rotate freely relatively to said shaft and to each other, means for transmitting steam or other motive power through a longitudinal passage way in said shaft to the coacting blades between said rotors, the motive power thus transmitted causing said rotors to rotate in opposite directions.

2. In a turbine engine, comprising a driving shaft and two concentric rotors mounted detachably thereon, one of said rotors having its ends bearing on the driving shaft and the other rotor having one end bearing on the driving shaft and the opposite end on the first named rotor, each rotor being normally free to rotate relatively to said shaft independently of the rotation of the other rotor, and means for transmitting motive power to said rotors.

3. A turbine embodying a central driving member provided with a longitudinal passage way for the transmission of steam or motive power, two concentric rotor sleeves mounted detachably thereon and provided with co-acting blades forming a working chamber between said rotors, means for locking either of said rotors to said central driving member and anchoring the other in a fixed, non-rotatable position, and means for passing motive power from the inlet passage way in said central member operatively through said working chamber to the exhaust at the opposite end thereof.

4. In a reversible steam turbine, the combination of three independently rotatable elements consisting of a driving shaft, two concentrically arranged rotors mounted detachably thereon and provided with co-acting driving blades or buckets between the same, means for coupling either of said rotors to said shaft to drive the same, means for anchoring the other rotor in a stationary non-rotating position, means for actuating said coupling and anchoring means, and an independent detachable stationary protective case wholly or partly inclosing the rotors, whereby accidental contact with the moving mechanism may be prevented.

5. A turbine engine embodying a central driving shaft provided with a longitudinal passage way for the transmission of steam, two concentric rotor sleeves mounted thereon but detachable therefrom, clutching devices for securing either rotor independently of the other to said driving shaft, means for anchoring the other rotor in a fixed, non-rotatable position, means for actuating said clutching and anchoring devices, and means for transmitting steam or other driving power through said passage way in the central shaft to the blade chamber between said rotors.

6. A turbine engine embodying a central driving shaft provided with a longitudinal passage way at each end thereof, two concentric rotor sleeves mounted thereon but detachable therefrom, clutching devices for securing either rotor independently of the other to said driving shaft, means for anchoring the other rotor in a fixed, non-rotatable position, means for actuating said clutching and anchoring devices, and means for transmitting steam or other driving power through the passage way at one end of said shaft to the blade chamber between said rotors, and discharging the same to the exhaust through the passage way at the opposite end of said shaft.

WILLIAM ROBINSON.

Witnesses:
MARY E. HARMON,
KATHERINE C. VROOMAN.

---

Copies of this patent may be obtained for five cents each, by addressing the "Commissioner of Patents, Washington, D. C."